(12) United States Patent
Leveaux et al.

(10) Patent No.: US 6,517,904 B1
(45) Date of Patent: Feb. 11, 2003

(54) ENAMELING OF ALUMINUM ALLOYS SURFACES

(75) Inventors: Marc Leveaux, La Madeleine (FR); Koen Lips, Ghent (BE); Nacy Crevits, Dudzele (BE); Sebastien Humez, Lille (FR)

(73) Assignee: Pemco Brugge N.V., Brugge (BE)

( * ) Notice: Subject to any disclaimer, the term of this patent is extended or adjusted under 35 U.S.C. 154(b) by 0 days.

(21) Appl. No.: 09/717,387

(22) Filed: Nov. 22, 2000

(30) Foreign Application Priority Data

Nov. 23, 1999 (EP) .............................. 99123342

(51) Int. Cl.⁷ .............................. B05D 3/02; B05D 3/10; B05D 1/36
(52) U.S. Cl. .................. 427/376.2; 427/330; 427/419.4
(58) Field of Search ........................ 427/376.2, 419.4, 427/330

(56) References Cited

U.S. PATENT DOCUMENTS

| | | | |
|---|---|---|---|
| 2,420,540 A | * 5/1947 | Hubbell | 75/0.5 |
| 2,932,584 A | * 4/1960 | Hubbell et al. | 117/53 |
| 3,222,266 A | 12/1965 | Page et al. | |
| 5,266,357 A | * 11/1993 | Preuss et al. | 427/376.5 |

FOREIGN PATENT DOCUMENTS

| | | | |
|---|---|---|---|
| EP | 0453897 | | 10/1991 |
| EP | 0522401 | | 1/1993 |
| EP | 0611834 | | 8/1994 |
| EP | 0648863 | | 4/1995 |
| EP | 931772 A | * | 7/1999 |
| GB | 840469 | | 12/1957 |

* cited by examiner

Primary Examiner—Michael Barr
(74) Attorney, Agent, or Firm—Hunton & Williams

(57) ABSTRACT

The present invention relates to a process for the enameling of aluminum or aluminum alloy surfaces, in particular containing a relatively high amount of Mg, Cu, or both, which is characterized by the use of a vitreous enamel containing CuO.

13 Claims, No Drawings

ENAMELING OF ALUMINUM ALLOYS SURFACES

BACKGROUND OF THE INVENTION (1) Field of Invention

The present invention relates to a process for the enameling of aluminum or aluminum alloy surfaces. In particular, aluminum or aluminum alloy surfaces containing a relatively high amount of magnesium (Mg), copper (Cu), or both.

(2) Description of Related Art

Aluminum alloys with relative high Mg and Cu contents tend to be susceptible to spalling. Spalling, in the context of the invention, is defined as flaking or chipping off of the vitreous enamel layer from the aluminum substrate after firing. Thereby, destroying the aesthetic and/or functional qualities of the enameled surface. Standard ISO/DIS 13805 (1998) describes a method to test the spalling resistance of an enameled aluminum surface. According to the prior art, it is well known that aluminum alloys, with amounts of Mg>50 PPM and/or Cu>0.2 weight percent (wt. %), are certainly susceptible to spalling.

It is known that magnesium in aluminum alloys, if not "tied up" into $Mg_2Si$ precipitates when silicon is present, migrates to the surface during the firing of a vitreous enamel layer applied thereto, and later forms magnesium oxide (MgO). Because MgO is hardly soluble in aluminum enamels, an intermediate layer is formed between the aluminum alloy surface and the enamel layer, when the diffusion of magnesium occurs during firing. After diffusion, magnesium can easily be oxidized by the contact with oxygen and high temperatures during the firing. The change $Mg+1/2O_2 \rightarrow MgO$ induces an increase of the volume, e.g., increase in the lattice parameter. This intermediate layer with high MgO content provides very poor adherence between the aluminum alloy and the enamel layer. During weathering, exposure to chemical attack, or thermal changes of such enameled surfaces, the intermediate layer corrodes and induces spalling through stresses at the interface.

Several methods have been proposed in order to improve the adherence of vitreous enamel layers on aluminum alloy surfaces. A popular technique is chromatation of the aluminum alloy surface before enameling. U.S. Pat. No. 3,222,266, EP 0,611,834 A1, and EP 0,648,863 B describe a method involving the anodisation of the aluminum alloy surface before enameling. A disadvantage of these methods is that the require high strength aluminum alloys. Further, these methods are expensive and in the case of chromatation, dangerous.

U.S. Pat. No. 2,932,584 and GB A 840,469 describe a method to avoid migration of Mg to the surface by tying up all the Mg in the aluminum alloy as $Mg_2Si$. A drawback of this method is that it involves adding silicon (Si) to the substrate in very precise ratios of Mg to Si.

EP 0,686,609 A1 describes adding iron oxide to the vitreous enamel slip during milling to improve adherence. A drawback of this method is that there exist aluminum alloy surfaces which cannot be successfully enameled with a standard vitreous enamel slip that only contains 1–10% by weight iron oxides as milling agent In addition, all of these prior methods are not suitable to provide sufficient adherence of the vitreous enamel layer to the aluminum alloy surface containing an amount of Mg>50 PPM, and/or an amount of Cu>0.2 wt. %.

BRIEF SUMMARY OF THE INVENTION

It is an object of the invention to improve the adherence between an aluminum or aluminum alloy surface and the vitreous enamel after filing and to solve the aforementioned problems in enameling processes of aluminum or aluminum alloy surfaces containing a high amount of Mg, Cu, or both.

A feature of the invention is the use of a vitreous enamel containing copper oxide (CuO) from the addition of CuO either directly into the composition of a standard vitreous enamel frit suitable for enameling on aluminum, or in the vitreous enamel slip prepared using a standard frit suitable for enameling on aluminum.

In an embodiment of the invention, a process for the enameling of aluminum or aluminum alloy surfaces comprises the step of using a vitreous enamel containing CuO. The surface layer is selected from a group consisting of: an aluminum cast alloy, an aluminum wrought alloy, a hot dip aluminum alloy, and a cladded aluminum alloy. The aluminum or aluminum alloy contains greater than 50 PPM Mg, greater than 0.2 wt. % Cu, or both. The process may include a degreasing, pickling, conversion treating, or a combination thereof, pretreatment. A content of CuO in the range of 0.5 to 20 wt. % is achieved by partly or completely adding CuO during a melting of a frit. Alternatively, CuO is added during enamel slip preparation.

In an another embodiment of the invention, the above process further comprises the step of adding 0.5 to 10 wt. % of an oxide selected from a group consisting of Ni, Fe, Co, Mn, Sb, Bi, Cr oxides, or a combination thereof, to the vitreous enamel. Alternatively, 10 to 40 wt. % $TiO_2$ may be added. These oxide additions are partly or completely added to the vitreous enamel frit during melting of the flit composition. Alternatively, the oxide additions are partly or completely added to the vitreous enamel slip during slip preparation.

In another embodiment of the invention, the above processes further comprise the step of preparing white and dark vitreous enamel layers as a single layer coating or as the first layer of a multi-layer coating, wherein a thickness of the layer is in the range of 0.5 and 100 µm.

An advantage of the invention is the improved adherence between the aluminum alloy surface and the vitreous enamel after firing. Another advantage of the invention is the ability to enamel aluminum alloys with relatively high contents of Mg and/or Cu, e.g., Mg>50 PPM, and/or an amount of Cu>0.2 wt. %.

Another advantage of the invention is the elimination of a special, expensive, and dangerous pre-treatment of the surface, e.g., chromatation or anodisation; the requirement of a special ratio of Mg to Si in order to precipitate Mg completely.

In addition, another advantage of the invention is that the addition of CuO provides better enameling than the addition of iron oxide as described in prior art EP 0 686 609 A1. Further, aluminum alloy surfaces, which cannot be successfully enameled with a standard vitreous enamel slip that contains 1–10% by weight iron oxides as milling agent, can be successfully enameled with a vitreous enamel slip made of frits containing CuO and/or by the use of CuO as a milling addition.

In addition to CuO, the present invention includes the use of any compounds which may result in the formation of CuO, particularly during the firing of the frit, and is not limited to the direct addition of CuO as such.

Other objects and advantages of the invention are set forth in part in the description which follows, and in part, will be apparent from this description, or may be learned from the practice of the invention.

DETAILED DESCRIPTION OF THE INVENTION

This invention depicts a method to enamel aluminum or aluminum alloy surfaces containing relatively high amounts of Mg and Cu. The surface layer is an aluminum cast alloy, an aluminum wrought alloy, a hot dip aluminum alloy or a cladded aluminum alloy. Further, these surfaces may be connected to other substrates. The invention is particularly suitable to enamel as defined above wherein the Mg content in the aluminum alloy surface is larger than 50 PPM, and in particular, larger than 100 PPM; wherein the Cu content in the aluminum alloy surface is greater than 0.2 wt. %, and in particular, greater than 0.4 wt. % by weight; or both.

Although the present invention allows enameling of aluminum or aluminum alloy surfaces as defined above without specific pretreatment, pretreatment of the surface according to the prior art may be administered in combination with the invention. For example, a simplified pretreatment of the surface may include degreasing and/or pickling only.

In an embodiment of the invention, a vitreous enamel slip is made of frits containing CuO and/or by the use of CuO as a milling addition. The amount of CuO in the vitreous enamel can be varied in a wide range. A preferred range of the content of CuO in the vitreous enamel composition, as applied to the substrate, is in the range of 0.5 to 20 wt. %, and more preferably in the range of 2 to 10 wt. %.

In alternative embodiments of the invention, other metal oxides can be used in addition to CuO, to further increase the adherence. In particular, oxides of Ni, Fe, Co, Mn, Sb, Bi, and Cr, as well Ti are used. In this respect, the use of 0.5 to 10 wt. % of one or more these oxides is preferred. However, the amount of $TiO_2$ in addition to CuO in the vitreous enamels used according to the present invention also can vary in a range of 10 to 40 wt. %.

The addition of Ti, Fe, Mn, Ni, Co, Sb, Bi, and Cr oxides improves the adherence, but much less than CuO. Thus, the combined addition of CuO and one or more of these oxides further improves the adherence of the vitreous enamel on aluminum alloy surfaces.

There are different ways of adding the oxides of Cu, Ti, Ni, Fe, Co, Mn, Sb, Bi and Cr to the vitreous enamel. In a first preferred embodiment those oxides are added partly or completely to the vitreous enamel frit during the melting of the frit composition. Thus, the oxides are added to the other enamel components and melted together. Alternatively, the oxides are added partly or completely during the vitreous enamel slip preparation, in particular during milling.

Due to the addition of CuO and one or more of the oxides of Ti, Fe, Mn, Ni, Co, Sb, Bi and Cr to the frit or the slip, it is of course not possible to achieve white or bright colors in a single layer coating, because the resulting vitreous enamel looks at least dark-grey after firing. However, white or bright colors can be achieved by a multi-layer coating technique, as described in EP 0 556 456 A1. This two coat/one fire technique (often used for steel enameling) in combination with the present invention, can successfully enamel white or bright colors on aluminum surfaces. In an embodiment of the invention, the adherence promoting oxides, as described in the above embodiments, are incorporated into a ground enamel layer. On top of this layer, a second white or bright colored enamel layer is applied. Both layers are first dried and then fired together.

Because conventional methods are limited to enameling low strength aluminum alloys due to the restriction of using low Mg and/or Cu contents, the method according to the present invention makes it possible to change to higher strength aluminum alloys with higher Mg and/or Cu contents. By doing this, one can obtain the same strength of a certain piece of ware with a thinner sheet thickness, which means reduction of weight, reduction of volume and reduction of price.

For producers of aluminum alloys themselves who do have problems obtaining Mg contents below the low limit of 50 PPM in order to obtain good adherence, using the method according to the present invention makes it possible to increase the tolerances for the maximum magnesium content. In that way, it will make the production easier to control, more safe and less expensive.

The invention is illustrated by the following non-limiting examples.

EXAMPLES

Table 1 displays the alloy content of commercially available wrought aluminum alloys supplied by Hoogovens Aluminum N.V. (Belgium, Duffel).

All percentages are by weight.

TABLE 1

| Alloy | 1050 * | 3003 * | 4917 * | 5005 * | 5555 * | 6082 * | 6061 * |
|---|---|---|---|---|---|---|---|
| Mg | <0.01 | <0.01 | 0.04 | 0.8 | 2.45 | 1.01 | 0.47 |
| Cu | 0.07 | 0.01 | 0.2 |  | 0.4 | 0.01 | 0.06 |
| Mn | 0.2 | 0.9 | 1.3 | 0.001 | 1.0 | 0.2 | 0.5 |
| Si | 1.0 | 0.2 | 1.4 | 0.1 | 1.0 | 0.1 | 0.9 |

* Aluminum Alloys according to the International Registration Record.
* Aluminum Alloys according to the internal Hoogovens Aluminum designation Table 2 displays the basic composition of vitreous enamel A in wt. %.

TABLE 2

|  | $Al_2O_3$ | $K_2O$ | $Li_2O$ | $Na_2O$ | $P_2O_5$ | $SiO_2$ | $TiO_2$ | $V_2O_5$ |
|---|---|---|---|---|---|---|---|---|
| Enamel A | 1 | 12 | 1 | 20 | 2 | 33 | 22 | 9 |

Spalling test results (ISO/DIS 13805) of examples 1 and 2, with CuO added during slip preparation, and comparative examples 1 to 3, without CuO added, enameled with enamel A are displayed in Table 3. The addition of CuO during slip preparation improves the adherence.

TABLE 3

| | (as milling agent added to the frits with basic comp) | | | | | | |
|---|---|---|---|---|---|---|---|
| Examples | Alloy | 1050 | 3003 | 4917 | 5005 | 5555 | 6082 | 6061 |
| Comp. Ex. 1 | Basic comp. | VG | VG | BAD | — | — | — | Bad |
| Comp. Ex. 2 | +6% Fe2O3 | VG | VG | BAD | BAD | VG | G | BAD |
| Comp. Ex. 3 | +12% Fe2O3 | VG | G | BAD | BAD | VG | G | BAD |
| Example 1 | +2% CuO | VG | VG | G | G | G | G | G |
| Example 2 | +5% CuO | VG | VG | G | VG | VG | VG | G |

Spalling test results (ISO/DIS 13805) of examples 3 to 6, with CuO added during frit production, and comparative example 1, without CuO added, enameled with enamel A are displayed in Table 4. The addition of CuO during frit production improves the adherence.

TABLE 4

(frit analysis - changes in regard to the frit with basic comp.)

| Examples | Alloy | 1050 | 3003 | 4917 | 5005 | 5555 | 6082 | 6061 |
|---|---|---|---|---|---|---|---|---|
| Comp. Ex. 1 | Basic comp. | VG | VG | BAD | — | — | — | Bad |
| Example 3 | +2.5%* CuO | VG | VG | G | VG | G | G | G |
| Example 4 | +3.25%* CuO | VG | VG | G | VG | VG | VG | G |
| Example 5 | +4%* CuO | VG | VG | G | VG | VG | VG | G |
| Example 6 | +5%* CuO | VG | VG | VG | VG | VG | VG | VG |

Adherence characterization is given as follows:

VG=very good=(no spalling);

G=good=(spalling <1 mm);

Bad=(surface completely spalled off); and

- - -=enamel chipped off completely after firing.

Other embodiments and uses of the invention will be apparent to those skilled in the art from consideration of the specification and practice of the invention disclosed herein. All documents referred to herein, including, but not limited to, all U.S. and foreign patent and patent applications, are specifically incorporated herein by reference. The specification and examples should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

What is claimed is:

1. A process for enameling aluminum cast alloy or aluminum wrought alloy surfaces comprising the step of using a vitreous enamel slip preparation containing CuO in the range of 0.5% to 20% by weight, wherein the aluminum cast alloy or aluminum wrought alloy has a Cu content of greater than 0.2% by weight and/or a Mg content greater than 50 ppm.

2. The process according to claim 1, wherein the Mg content is greater than 100 ppm.

3. The process according to claim 1, wherein the Cu content is greater than 0.4% by weight.

4. The process according to claim 1, further comprising the step of pre-treating the surface, wherein the step of pre-treating is selected from a group consisting of degreasing, pickling, and both.

5. The process according to claim 1, further comprising the step of conversion treating the aluminum cast alloy or aluminum wrought alloy surface prior to using the vitreous enamel containing CuO.

6. At The process according to claim 1, wherein the CuO content is 2 to 10 wt. %.

7. The process according to claim 1, wherein CuO is added partly or completely during melting of a frit.

8. The process according to claim 1, wherein CuO is added partly or completely during enamel slip preparation.

9. The process according to claim 1, wherein the enamel further comprises 0.5% to 10% by weight of an oxide selected from a group consisting of Ni, Fe, Co, Mn, Sb, Bi, Cr oxides, and a combination thereof.

10. The process according to claim 1, wherein the enamel further comprises 10% to 40% $TiO_2$ by weight.

11. The process according to claim 9 or 10, wherein the oxides of Ti, Ni, Fe, Co, Mn, Sb, Bi, Cr, or a combination thereof are partly or completely added to the vitreous enamel during melting of a frit.

12. The process according to claim 9 or 10, wherein the oxides of Ti, Ni, Fe, Co, Mn, Sb, Bi, Cr, or a combination thereof are partly or completely added to the vitreous enamel during enamel slip preparation.

13. The process according to claim 1, further comprising the step of preparing white and dark vitreous enamel layers as a single layer coating or as the first layer of a multi-layer coating, wherein a thickness of the layer is in the range of 0.5 and 100 μm.

* * * * *